(12) United States Patent
Ogasawara et al.

(10) Patent No.: US 6,218,655 B1
(45) Date of Patent: Apr. 17, 2001

(54) OPTICAL PICKUP

(75) Inventors: Masakazu Ogasawara; Sakashi Ohtaki; Kiyoshi Tateishi, all of Tsurugashima (JP)

(73) Assignee: Pioneer Electronic Corporation, Tokyo-to (JP)

( * ) Notice: Subject to any disclaimer, the term of this patent is extended or adjusted under 35 U.S.C. 154(b) by 0 days.

(21) Appl. No.: 09/271,624

(22) Filed: Mar. 17, 1999

(30) Foreign Application Priority Data

Mar. 20, 1998 (JP) .................................................. 10-072912

(51) Int. Cl.[7] .......................... G02B 27/40; G02B 27/64; G02B 7/04
(52) U.S. Cl. ..................... 250/201.5; 349/202; 369/109
(58) Field of Search ..................... 250/201.5; 369/109, 369/44.23, 112; 349/201, 202

(56) References Cited

U.S. PATENT DOCUMENTS

| 5,650,835 | * | 7/1997 | Matic ................................... 349/201 |
| 5,777,706 | * | 7/1998 | Chen ...................................... 349/74 |
| 5,815,222 | * | 9/1998 | Matsuda et al. .......................... 349/1 |
| 5,909,422 | * | 6/1999 | Kamatani ............................... 369/94 |
| 6,034,939 | * | 3/2000 | Takasawa et al. .................... 369/112 |

* cited by examiner

*Primary Examiner*—Georgia Epps
*Assistant Examiner*—Jordan M. Schwartz
(74) *Attorney, Agent, or Firm*—Ladas & Parry

(57) ABSTRACT

An optical pickup for irradiating a light beam onto an information recording medium and receiving a light reflected by the medium, includes a light source for emitting a light beam, and a liquid crystal panel for diffracting the light beam to produce a main beam and a plurality of sub-beams to be irradiated on the medium. The liquid crystal panel included a first area in which a first group of grating patterns with predetermined pitches is formed and a second area in which a second group of grating patterns having the predetermined pitches is formed, and the first group of grating patterns and the second group of grating patterns are arranged on a plane with a gap area formed between the first area and the second area so as to form an integrated grating pattern. The optical pickup further includes a control unit for applying a first voltage to the first area to control a refractive index of the first area and applying a second voltage to the second area to control a refractive index of the second area, thereby to control a diffraction characteristic of the integrated grating pattern.

17 Claims, 13 Drawing Sheets

FIG. 3A
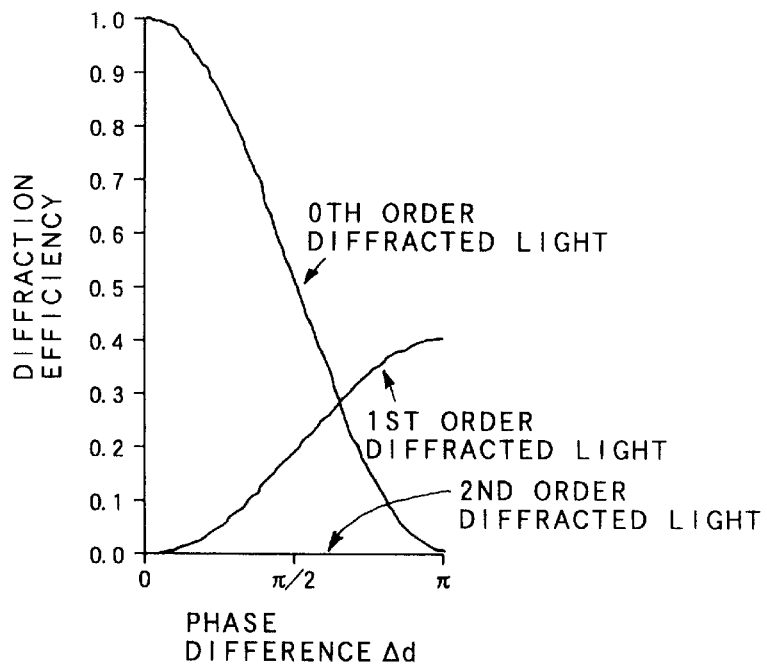
FIG. 3B  FIG. 3C  FIG. 3D
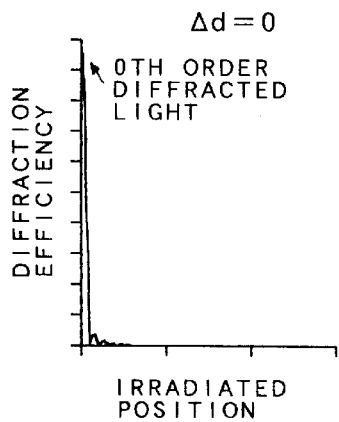 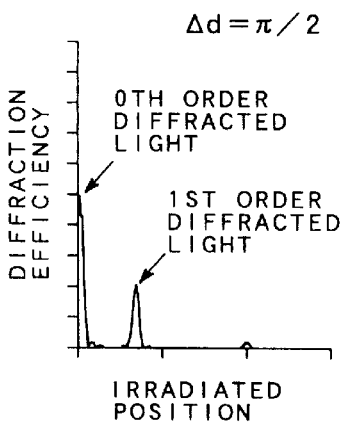 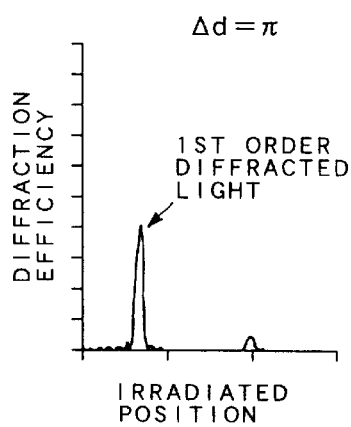

1 BEAM MODE

DPP MODE

CTC MODE

1 BEAM MODE

DPP MODE

CTC MODE

OPTICAL PICKUP

BACKGROUND OF THE INVENTION

1. Field of the Invention

The present invention relates to an optical pickup for recording or reproducing information on or from information recording media such as CD and DVD by irradiating a light beam onto the information recording media.

2. Description of the Related Art

Conventionally, an optical pickup to be used for reproduction and the like from an information recording medium such as DVD is constituted so that a main-beam is irradiated in order to detect information pits on a recording track and a plurality of sub-beams are irradiated onto predetermined positions for various objects such as a tracking information detection by means of the a so-called three-beam method and an operation of a cross talk canceller in order to suppress cross talk from adjacent tracks. For this reason, it is generally performed that a light beam is diffracted by a diffraction grating to produce diffracted lights which are irradiated as sub-beams.

Recently, in order to realize the diffraction grating for use in an optical pickup, a liquid crystal panel has been utilized. Namely, a split form of the liquid crystal panel is formed as a grating pattern, and the diffracted light can be irradiated as sub-beams by giving a phase difference due to a refractive index change to the light beam passing through the liquid crystal panel according to a birefringence effect of the liquid crystal.

In such a liquid crystal panel, a desired diffraction efficiency can be obtained by setting the split form suitably, and the phase change to be given to the light beams can be adjusted by controlling an applied voltage to the liquid crystal panel. Moreover, it is comparatively easy to perform switched control between the irradiation of only a main-beam irradiation and three beams or the like. Therefore, when the liquid crystal panel is used as the diffraction grating, it is possible to provide an optical pickup which is effective for recording on or reproduction from DVD and the like.

However, it is not easy to operate the conventional optical pickup utilizing the liquid crystal panel with changing the irradiated positions of the main-beam and sub-beams. Namely, the distances of beam spots of the main-beam and sub-beams change in inverse proportion to a grating pitch of the diffraction gratings. While the phase difference can be changed by controlling the applied voltage to the liquid crystal panel, the distances of the beam spots should be fixed because the grating pitch is preset as the split form.

In addition, it is conceivable to provide and suitably switch two kinds of liquid crystal panels on which the diffraction grating are formed with different pitches. However, if the optical pickup is constituted in such a manner, it is not easy to adjust the orientation of the liquid crystals relative to the light beams and the positioning of the liquid crystal panels, and thus this causes a rise in the cost.

SUMMARY OF THE INVENTION

The present invention has been achieved with such points in view, and its object is to provide an optical pickup using a liquid crystal panel as a diffraction grating and having a simple structure in which an irradiation state and a positional relationship of a main-beam and sub-beams can be readily controlled.

According to one aspect of the present invention, there is provided an optical pickup for irradiating a light beam onto an information recording medium and receiving a light reflected by the medium, including: a light source for emitting a light beam; a liquid crystal panel for diffracting the light beam to produce a main beam and a plurality of sub-beams to be irradiated on the medium, the liquid crystal panel including a first area in which a first group of grating patterns with predetermined pitches is formed and a second area in which a second group of grating patterns having the predetermined pitches is formed, the first group of grating patterns and the second group of grating patterns being arranged on a plane with a gap area formed between the first area and the second area so as to form an integrated grating pattern; and a control unit for applying a first voltage to the first area to control a refractive index of the first area and applying a second voltage to the second area to control a refractive index of the second area, thereby to control a diffraction characteristic of the integrated grating pattern.

In accordance with the optical pickup thus configured, the light beam from the light source passes through the integrated grating pattern of the liquid crystal panel and is diffracted. Here, the liquid crystal panel includes the first area and second area, and the first and the second groups of grating patterns are formed in the first and second areas, respectively. These groups of grating patterns are arranged on a plane with a gap area formed therebetween. The pitch of the grating patterns in the first area may be equal to the pitch of the grating patterns in the second area. Here, the pitch of the grating patterns is a spatial period with which the phase change to be given to the light beam is repeated, and when basic patterns are repeatedly arranged, the grating patterns are formed.

The light beam passed through the liquid crystal panel is divided into the main-beam and the sub-beams as diffracted light, and they are irradiated onto the information recording medium. At this time, the control unit varies the first voltage to be applied to the first area and the second voltage to be applied to the second area so as to control the refractive indexes of both the areas. Namely, the phase difference is given to the light beams passed through the first and second areas, and the diffraction efficiency and diffraction angle of the diffracted lights can be controlled by the voltages applied to the first and the second areas.

Therefore, the irradiation state of the sub-beams can be changed with respect to the main-beam, and the control can be made so that the phase change by diffracting the light beams is given by one or both of the first and second areas. Since the pitch can be varied, the relative irradiated positions of the sub-beams can be changed without complicating the structure of the optical pickup. As a result, the optical pickup, which has the simple structure and can easily control the diffraction characteristic, is provided.

The control unit may operate by selecting one of a first mode for applying both the first voltage and second voltage and a second mode for applying either one of the first voltage and second voltage. By this, the control unit controls the first voltage to be applied to the first area and the second voltage to be applied to the second area. In the first mode, both the first voltage and second voltage are applied. In the second mode, one of the first voltage and second voltage is applied. Therefore, in the first mode, the light beam is diffracted by the integrated grating pattern formed by the grating patterns of the second area. In the second mode, the light beam is diffracted by the integrated grating pattern of the first and second areas. Thus, the pitch in the first mode and the second mode may be altered, and as a result the irradiated positions of the sub-beams on the information recording medium may be appropriately controlled.

The control unit may operate by selecting one of a first mode for applying both the first voltage and second voltage, a second mode for applying either one of the first voltage and second voltage, and a third mode for applying neither the first voltage nor second voltage. By this, the first and second modes as well as the third mode can be selected, and in the third mode, neither the first voltage nor the second voltage is applied by the control unit. Therefore, in the third mode, the liquid crystal panel does not serve as the diffraction grating, and only the main-beam is irradiated onto the information recording medium. As a result, the optical pickup can be operated by switching between the recording/ reproduction using the 1 beam and the recording/ reproduction using the 3 beams.

Preferably, a direction and the pitch of the grating patterns may be preset such that the main-beam is irradiated onto a recording track and the sub-beams are irradiated onto intertracks neighboring to the recording track on which the main-beam is irradiated in the second mode and the main-beam is irradiated onto a recording track and the sub-beams are irradiated onto the recording tracks neighboring to the recording track on which the main-beam is irradiated in the first mode. In a preferred embodiment, the optical pickup may further include a light receiving unit including first to fifth detectors arranged in a line, wherein the third detector receives the main-beam reflected by the recording track in the first to third modes, wherein the second and the fourth detectors neighboring the third detector receive the sub-beams reflected by the inter-tracks in the second mode, and wherein the first and the fifth detectors positioned outside of the second detector and the fourth detector, respectively, receive the sub-beams reflected by the neighboring tracks in the first mode. In more specific embodiment, the first detector may be a four-divided detector, and wherein the second detector and the fourth detector may be two-divided detectors.

In another preferred embodiment, the control unit may include a liquid crystal driver for outputting the first voltage to the first area and outputting the second voltage to the second area; and a controller for controlling the voltage outputted by the liquid crystal driver. Further, the liquid crystal driver may additionally output a reference voltage to whole area of the liquid crystal panel including the first area, the second area and the gap area. Also, the optical pickup may further include an objective lens for converging the main-beam and the sub-beams on the recording medium.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIGS. 3A to 3D are graphs for explaining a change in the diffraction characteristic of a grating pattern according to the embodiment with respect to a phase difference thereof, wherein FIG. 3A shows a relationship between the phase difference and a diffraction efficiency, and FIGS. 3B through 3D show a relationship between a beam irradiated position and the diffraction efficiency.

FIGS. 4A to 4C are graphs for explaining a change in the diffraction characteristic of the grating pattern according to the embodiment with respect to a duty thereof, wherein FIG. 4A shows a relationship between the duty and the diffraction efficiency, and FIGS. 4B and 4C show a relationship between the beam irradiated position and the diffraction efficiency.

FIGS. 5A and 5B are graphs for explaining a change in the diffraction characteristic of the grating pattern according to the embodiment with respect to a pitch thereof, wherein FIG. 5A shows a relationship between the emitting position and the diffraction efficiency at the time of a pitch P, and FIG. 5B shows a relationship between the emitting position and the diffraction efficiency at the time of a pitch P/2.

FIGS. 6A to 6C are diagrams showing an arrangement of beam spots on a recording surface of an optical disc according to the embodiment of the present invention, wherein FIG. 6A shows the arrangement in a case of one-beam mode, FIG. 6B shows the arrangement in a case of DPP mode, and FIG. 6C shows the arrangement in a case of CTC mode.

FIGS. 7A to 7C are diagrams showing a configuration of a detection unit for receiving a reflected light from the beam spots on the recording surface of the optical disc according to the embodiment of the present invention, wherein FIG. 7A shows the case of the one-beam mode, FIG. 7B shows the case of the DPP mode, and FIG. 7C shows the case of the CTC mode.

FIGS. 9A and 9B are graphs for explaining the diffraction characteristic in the case where the liquid crystal panel satisfies Va=Vb0, wherein FIG. 9A shows the phase difference to be generated by the grating pattern, and FIG. 9B shows a relationship between the beam irradiated position and the diffraction efficiency.

FIGS. 10A and 10B are graphs for explaining the diffraction characteristic in the case where only Va is applied to the liquid crystal panel and Vb=0 is satisfied, wherein FIG. 10A shows the phase difference to be generated by the grating pattern, and FIG. 10B shows a relationship between the beam irradiated position and the diffraction efficiency.

FIGS. 11A and 11B are graphs for explaining the diffraction characteristic in the case where both Va and Vb are applied to the liquid crystal panel according to the embodiment of the present invention, wherein FIG. 11A shows the phase difference to be generated by the grating pattern, and FIG. 11B shows a relationship between the beam irradiated position and the diffraction efficiency.

DETAILED DESCRIPTION OF THE PREFERRED EMBODIMENTS

There will be described below preferred embodiments of the present invention with reference to the drawings. Here, the following description will refer to the case that the present invention is applied to an optical pickup to be used for recording or reproducing information on or from an optical disc.

Figure 1:
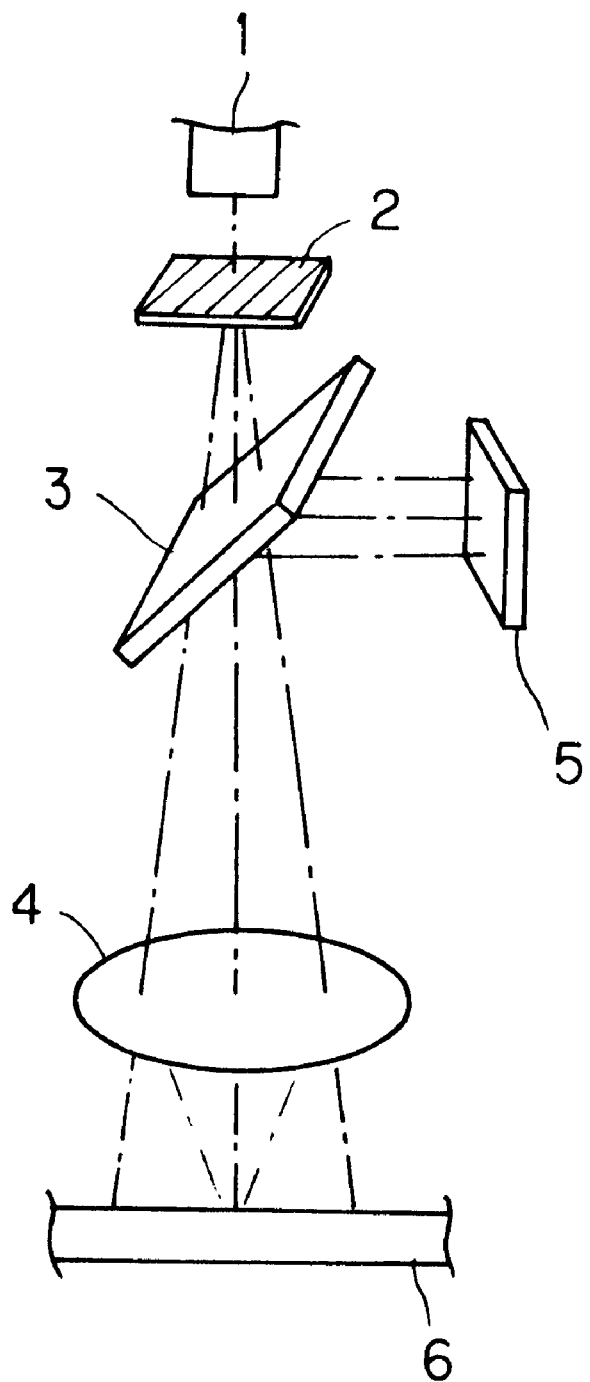
FIG. 1 is a diagram showing a schematic configuration of an optical pickup according to an embodiment of the present invention.

FIG. 1 is a diagram showing a schematic configuration of an optical pickup according to the present embodiment.

As shown in FIG. 1, the optical pickup has a semiconductor laser 1, a liquid crystal panel 2, a beam splitter 3, an objective lens 4, and a detection unit 5 for receiving reflected lights from an optical disc 6.

In the above structure, when a light beam irradiated from the semiconductor laser 1 passes through a portion of a grating pattern formed on the liquid crystal panel 2, it is diffracted so as to be split into a main-beam and plural sub-beams. The main-beam and the sub-beams are produced in accordance with the voltage applied to the liquid crystal panel 2, and pass through the objective lens 4 to be irradiated onto the optical disc 6. The structure of the liquid crystal panel 2 will be detailed later.

One beam spot or three beam spots are formed on a recording surface of the optical disc 6 by the light beams in a fashion being located on a straight line with predetermined intervals therebetween. The reflected lights from the beam spots pass through the objective lens 4 and are reflected by the beam splitter 3 to be received by the detection unit 5. The arrangement of the beam spots on the recording surface of the optical disc 6 will also be detailed later.

Next, the description will be given of a principle of diffraction of the light beam by means of the diffraction grating with reference to FIGS. 2 through 5.

In general, when a light beam passes through a diffraction grating on which the grating pattern is provided, the light beam is divided into a 0th order diffracted light to be irradiated onto an original optical axis of the light beam, and higher order diffracted lights to be irradiated on a straight line on an irradiation surface with predetermined intervals therebetween. Here, taking only the light beams of up to 1st order diffracted lights into consideration, a 0th order diffracted light serving as a main-beam and 1st order diffracted lights serving as two sub-beams which are arranged symmetrically with respect to the main-beam on the straight line are irradiated. Such a diffraction grating can be realized by forming convexoconcave portions on a flat plate such as a glass plate, but in the present embodiment, as mentioned below, this is realized by using the liquid crystal panel 2.

In the liquid crystal panel 2 according to the present embodiment, the diffraction grating is constituted by controlling the voltages applied to two grating pattern areas adjacent to each other to differentiate the refractive indexes of these two areas from each other, thereby giving a phase difference $\Delta d$ to the passing light beam. The arrangement, the emission intensities and the like of the main-beam and sub-beams may be controlled by changing a pitch P and a duty D of the grating patterns as well as the phase difference $\Delta d$ between the two areas.

Figure 2:
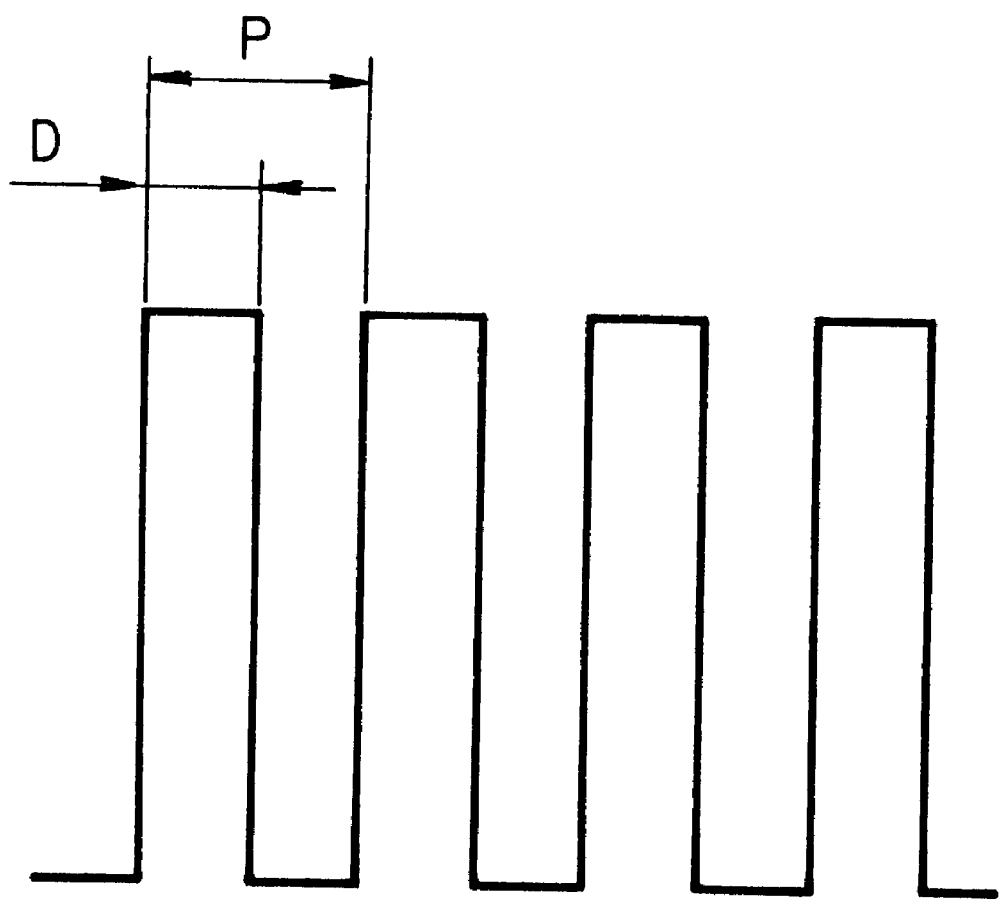
FIG. 2 is a diagram explaining parameters for determining a diffraction characteristic of a liquid crystal panel according to the embodiment of the present invention.

FIG. 2 is a diagram showing the relationship between the pitch P and the duty D which serve as parameters for determining the diffraction characteristic of the grating pattern formed on the liquid crystal panel 2. As shown in FIG. 2, the grating pattern of the liquid crystal panel 2 is formed by a plurality of repetitive patterns each having a predetermined pitch P and duty D. Different voltages are applied to the two areas which are adjacent to each other on a boundary of the grating patterns on the liquid crystal panel 2. Dependently upon the voltages thus applied, a certain phase difference $\Delta d$ is introduced to the light beams passing through the liquid crystal panel 2. Namely, the duty D and pitch P can be changed by suitably adjusting a form of the grating pattern on the liquid crystal panel 2, and the phase difference $\Delta d$ generated by the liquid crystal panel 2 can be adjusted by the applied voltage to the liquid crystal panel 2.

Next, the description will be given as to how the diffraction characteristic changes in the case where the phase difference $\Delta d$ of the grating pattern, pitch P and duty D are changed, with reference to FIGS. 3 through 5.

FIG. 3A is a graph showing a change in a diffraction efficiency in the case where the phase difference $\Delta d$ is changed while the pitch P and the duty D (50%) of the grating pattern are fixed. Here, the diffraction efficiency is a ratio of the intensities of diffracted lights for each diffraction order. FIG. 3A shows the diffraction efficiencies for the diffracted lights of 0th, 1st and 2nd diffraction orders in the case where the phase difference $\Delta d$ is changed within a range of 0 to $\pi$. As is clear from the graph, when the phase difference $\Delta d=0$, the light beam is not diffracted, and thus only 0th order diffracted light is generated. As the phase difference $\Delta d$ becomes closer to $\pi$, the 1st order diffracted light becomes stronger, and reversely the 0th order diffracted light becomes weaker. Under the condition that the duty D=50%, the 2nd order diffracted light is not generated even if any phase difference $\Delta d$ is given.

In addition, FIGS. 3B to 3D are graphs showing relationships between the irradiated position of the respective diffracted lights on the irradiation surface and the diffraction efficiency in the case where the phase difference are set to $\Delta d=0$, $\pi/2$ and $\pi$ on the graph of FIG. 3A. Namely, as mentioned above, since the respective diffracted lights are irradiated in the order of their diffraction orders onto the irradiation surface linearly with constant intervals therebetween, a spatial arrangement of the beam spots can be grasped. According to the result of FIG. 3A, it is found that only the 0th order diffracted light is irradiated when $\Delta d=0$ (FIG. 3B), the 0th order diffracted light and 1st order diffracted light are irradiated with a predetermined proportion when $\Delta d=\pi/2$, (FIG. 3C), and only the 1st order diffracted light is irradiated when $\Delta d=\pi$ (FIG. 3D).

Figure 4A:
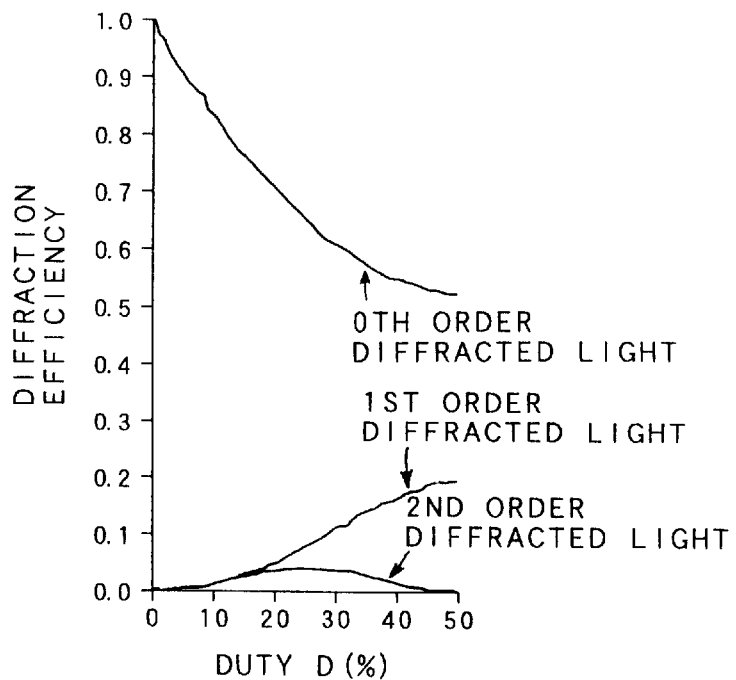

FIG. 4A is a graph showing a change in the diffraction efficiency in the case where the phase difference $\Delta d$ ($\pi/2$) and the pitch P of the grating pattern are fixed and the duty D is varied. FIG. 4A shows the diffraction efficiency of the 0th, 1st and 2nd orders of the diffraction if the duty D is varied in a range of 0% to 50%. As is clear from the graph, since the diffraction does not occur when the duty D=0%, only the 0th order diffracted light is generated. As the duty D approaches 50%, the 0th order diffracted light becomes gradually weaker, whereas the 1st order diffracted light becomes gradually stronger. The 2nd order diffracted light has a small peak in the vicinity of D=25%.

Figure 4B:
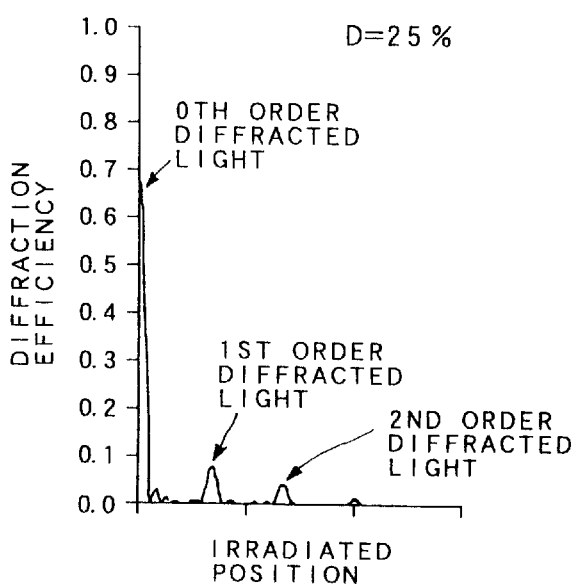
Figure 4C:
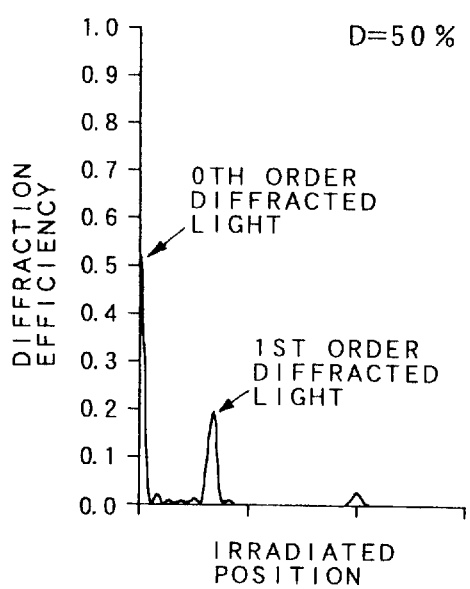

In addition, FIGS. 4B and 4C are graphs showing relationships between the irradiated positions of the diffracted lights on the irradiation surface and the diffraction efficiencies in the case where the duty D=25% and 50% on the graph of FIG. 4A. According to the result of FIG. 4A, the 0th order diffracted light, 1st order diffracted light and 2nd order diffracted light are irradiated respectively when D=25%, but the 0th order diffracted light occupies the major part thereof (FIG. 4B). When D=50%, the 0th order diffracted light and the 1st order diffracted light are irradiated with a predetermined proportion therebetween (FIG. 4C).

Figure 5A:
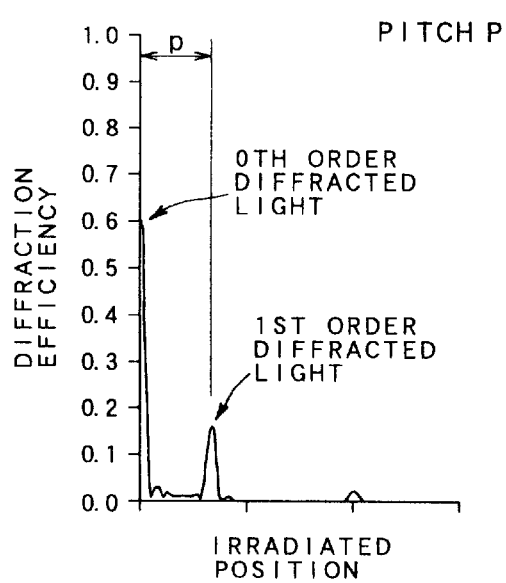
Figure 5B:
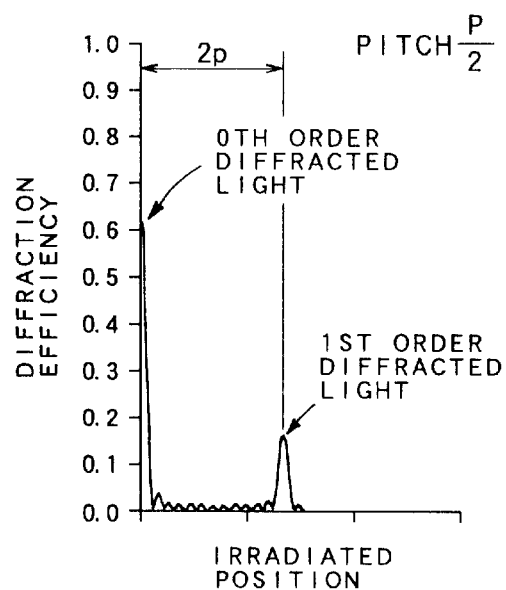

FIGS. 5A and 5B are graphs showing the change in the diffraction efficiencies in the case where the phase difference $\Delta d$ ($\pi/2$) and the duty D (50%) of the grating pattern are fixed and the pitch P is varied. Here, the case of a predetermined pitch P is compared with the case of a pitch P/2 which is half of the pitch P. FIG. 5A is a graph showing a relationship between irradiated positions of the diffracted lights on the irradiation surface and the diffraction efficiencies at the time of the pitch P, and a distance between the irradiated position of the 0th order diffraction and the irradiated position of the 1st order diffraction is p. Meanwhile, FIG. 5B is a similar graph in the case of the pitch P/2, and the distance between the irradiated position of the 0th order diffracted light and the irradiated position of the 1st order diffracted light is 2p. Namely, it is found that when the pitch P is halved, the distance between the irradiated positions is doubled, and thus the pitch P is in inverse proportion to the distance between the irradiated positions.

As described above, the proportion of the diffracted lights of respective orders can be adjusted by changing the phase difference Δd and the duty D of the grating pattern, and the irradiated positions of the diffracted lights can be adjusted by changing the pitch P of the grating pattern.

Next, the arrangement of the beam spots on the recording surface of the optical disc 6 on which the diffracted lights are irradiated by the liquid crystal panel 2 will be described with reference to FIG. 6. Here, the description will be given as to the case where the optical pickup according to the present embodiment is provided such as to operate in three modes according to the irradiation states of the light beams to the optical disc 6, i.e., one-beam mode in which only one beam is irradiated, a DPP mode in which a tracking detection by means of differential push-pull (hereinafter referred to as "DPP") is performed, and a CTC mode which performs a cross talk cancel operation (hereinafter, referred to as "CTC"). The concrete configuration and control method of the liquid crystal panel 2 for performing the respective modes will be described later.

Figure 6A:
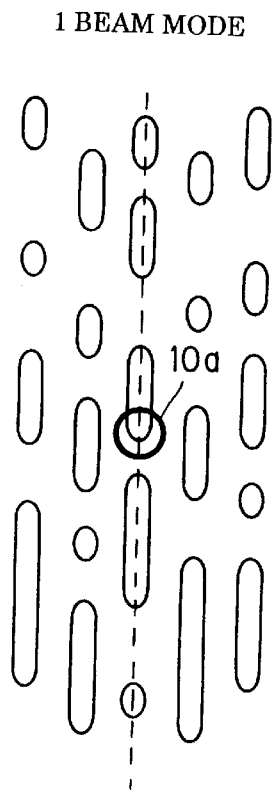

FIG. 6A shows the arrangement of the beam spots on the recording surface of the optical disc 6 in the one-beam mode. As shown in FIG. 6A, a main-beam spot 10a is irradiated onto a predetermined recording track formed on the optical disc 6. This main-beam spot 10a corresponds to the aforementioned 0th order diffracted light. The liquid crystal panel 2 is so adjusted that the 1st order diffracted light is not produced.

A reflected light from the main-beam spot 10a is received by the detection unit 5 after its intensity is modulated by the information pits formed on the recording track. At this time, if the detection unit 5 has a form divided into four detecting elements, the focus error and the tracking error can be detected by receiving the reflected light from the main-beam spot 10a.

Figure 6B:
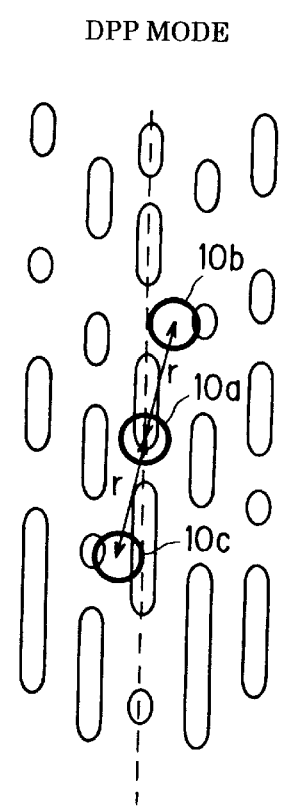

FIG. 6B shows the arrangement of the beam spots on the recording surface of the optical disc 6 in the DPP mode. As shown in FIG. 6B, the main-beam spot 10a is irradiated similarly to the case of the 1-beam mode, and additionally the sub-beam spots 10b and 10c are irradiated onto the positions symmetric with respect to the main-beam spot 10a on a straight line in the such a fashion that the main-beam spot 10a is sandwiched between the sub-beam spots 10b and 10c with the intervals r therebetween. The sub-beam spots 10b and 10c correspond to the aforementioned 1st order diffracted lights diffracted by the liquid crystal panel 2.

The main-beam spot 10a is irradiated onto a recording track, and the sub-beam spots 10b and 10c are irradiated onto the guide tracks which are formed between the recording track on which the main-beam 10a is irradiated and the adjacent recording tracks thereof. At this time, if the three detectors 5 for receiving the reflected lights from the respective beam spots are provided so as to detect respective radial push-pull signals and then the differences of those signals are calculated, a detection of a tracking error may be achieved in a manner hardly affected by offset.

Figure 6C:
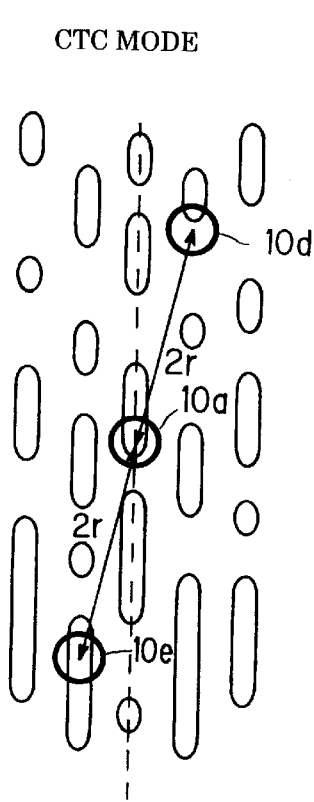

FIG. 6C shows the arrangement of the beam spots on the recording surface of the optical disc 6 in the CTC mode. As shown in FIG. 6C, the aforementioned main-beam spot 10a is irradiated, and additionally the sub-beam spots 10d and 10e are irradiated onto the positions symmetric with respect to the main-beam spot 10a on a straight line in such a fashion that the main-beams spot 10a is sandwiched by the sub-beam spots 10d and 10e with the intervals 2r therebetween. Similarly to the sub-beam spots 10b and 10c, the sub-beam spots 10d and 10e correspond to the 1st order diffracted lights. However, since the pitch P of the grating pattern on the liquid crystal panel 2 is halved, the distance between the beam irradiated positions is doubled compared with the sub-beam spots 10b and 10c shown in FIG. 6B. Here, this point will be described in more detail later.

The main-beam spot 10a is irradiated onto one recording track, and the sub-beam spots 10d and 10e are irradiated onto recording tracks adjacent to the recording track on which the main-beam 10a is irradiated. At this time, the influence of a cross talk from the adjacent recording tracks can be suppressed if the detecting signals of the detection unit 5 corresponding to the detecting reflected lights from the sub-beam spots 10d and 10e is multiplied by a predetermined coefficient and the multiplication result is subtracted from the detecting signal of the detection unit 5 corresponding to the reflected light from the main-beam spot 10a. Thus, the crosstalk canceling is performed.

Figure 7A:
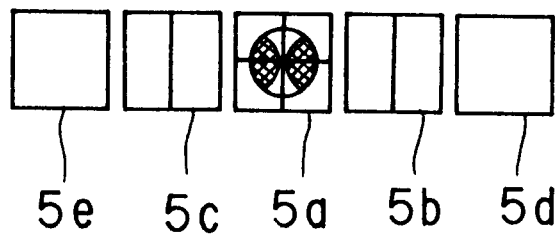
Figure 7B:
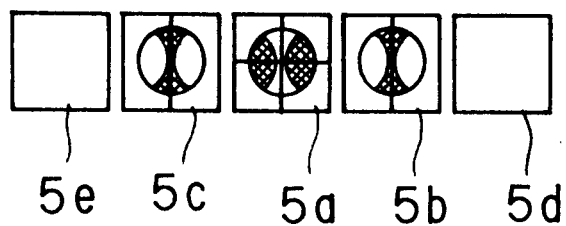
Figure 7C:
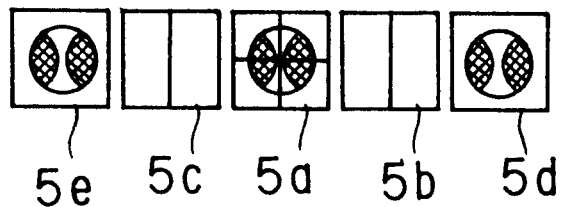

FIGS. 7A to 7C are diagrams showing the configuration of the detection unit 5 for receiving the reflected lights from the beam spots. As shown, in order to commonly use a unique detector for the irradiation states of the light beams in all the one-beam mode, the DPP mode and the CTC mode, the detection unit 5 having the five detectors 5a to 5e are employed. Namely, the detection unit 5 includes the detector 5a to be used for the main-beam spot 10a, the detectors 5b and 5c to be used for the sub-beam spots 10b and 10c positioned on both sides of the beam spot 10a with intervals r therebetween, and the detectors 5d and 5e to be used for the sub-beam spots 10d and 10e positioned with intervals 2r therebetween.

As shown in FIG. 7A, in the one-beam mode shown in FIG. 6A, only the central detector 5a receives the reflected light from the main-beam spot 10a and other detectors 5b to 5e receives no reflected lights. As shown in FIG. 7B, in the DPP mode shown in FIG. 6B, the central detector 5a receives the reflected light from the main-beam 10a and the detectors 5b and 5c receive the reflected lights from the sub-beam spots 10b and 10c, respectively. As shown in FIG. 7C, in the CTC mode shown in FIG. 6C, the central detector 5a receives the reflected light from the main-beam 10a and the detectors 5d and 5e receive the reflected lights from the sub-beam spots 10d and 10e, respectively.

As mentioned above, the detector 5a is configured to have the four-divided detecting elements, and the detectors 5b and 5c are configured to have two-divided detecting elements in a radial direction. Since the detectors 5d and 5e are used in the CTC mode, it is not necessary that they have a divided form.

Figure 8:
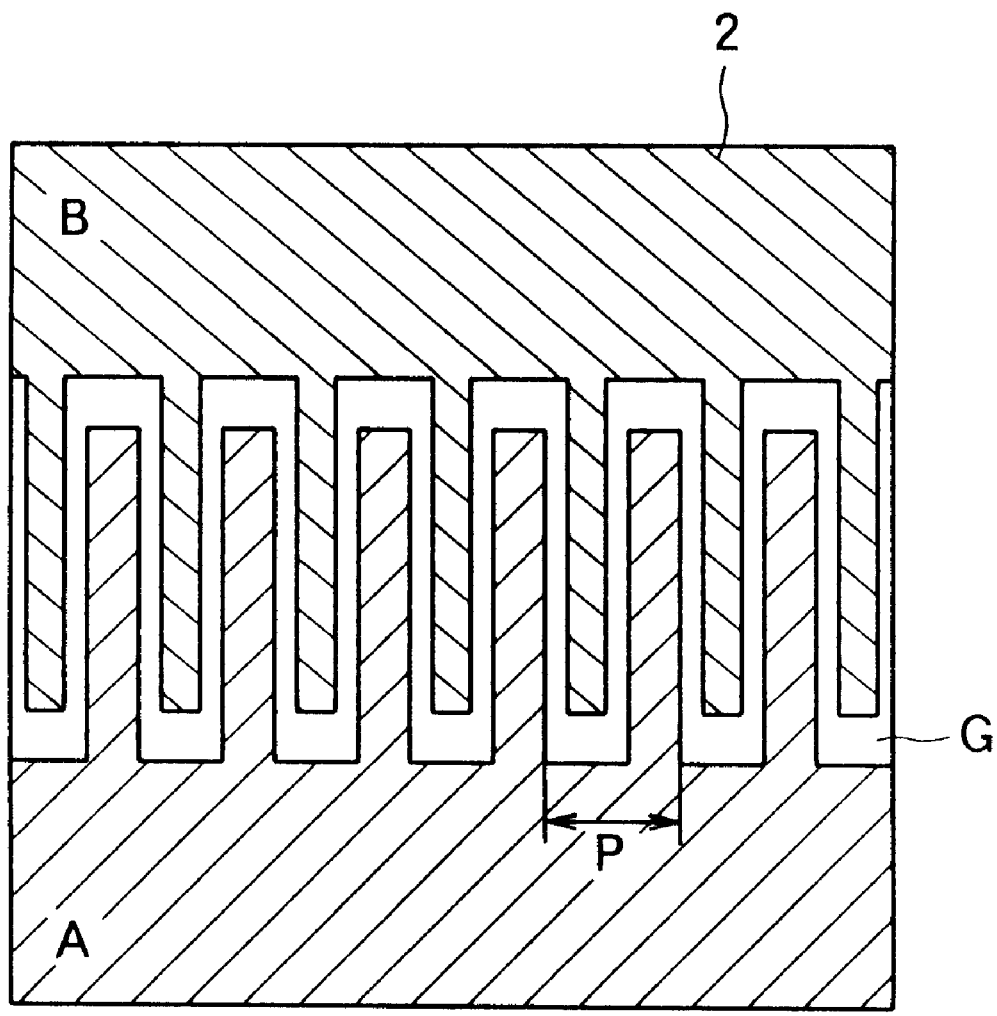
FIG. 8 is a diagram showing a configuration of the liquid crystal panel according to the embodiment of the resent invention.

Next, the configuration of the liquid crystal panel 2 according to the present embodiment will be described. As shown in FIG. 8, the liquid crystal panel 2 according to the present embodiment has an area A serving as a first area to which a first voltage Va is applied, and an area B serving as a second area B to which a second voltage Vb is applied. The grating patterns are formed on one ends of both the areas A and B, and the grating patterns on both areas A and B are combined on a plane with a small gap area G at the boundary portion of the areas A and B on the liquid crystal panel 2, thereby forming the integrated grating patterns.

The grating patterns formed respectively on the areas A and B have the same pitch P. The duty D of the area A is 50% and the duty D of the area B is 25%. Here, if the duty D of the area A becomes equal to the duty D of the area B, the areas A and B contact with each other. For this reason, it is necessary to set the duty D of the one of the areas A and B to be smaller than the duty D of the other of the areas. Alternatively, if the grating patterns on both areas do not contact with each other, the duties D of the areas A and B may be the same value. For example, both of the duties D may be set to 20%. Also, a certain bias voltage Vc, mentioned later, may be applied to the whole area of the liquid crystal panel 2 including the areas A and B and the gap area G in the boundary portion, and such a bias voltage may serve as a reference voltage for the applied voltages Va and Vc.

The areas A and B are provided with transparent electrodes for applying the voltage to their surface, and inner portions of the areas A and B are composed of liquid crystal having birefringence. When the voltage is applied to the transparent electrodes, an optical path difference according to the applied voltage is given to a light beam passing through the liquid crystal 2 due to the birefringence effect of liquid crystal molecules, and thereby the above-mentioned phase difference Δd is generated. As a result, as mentioned above, the portion of the grating patterns at the boundary portion of the areas A and B functions as the diffraction grating, and the phase difference Δd and the diffracted light according to the pitch P and duty D of the grating patters can be obtained.

Next, the description will be given of the change in the diffraction characteristic of the liquid crystal panel by the control of the applied voltages Va and Vb with reference to FIGS. 9 to 11.

Figure 9A:
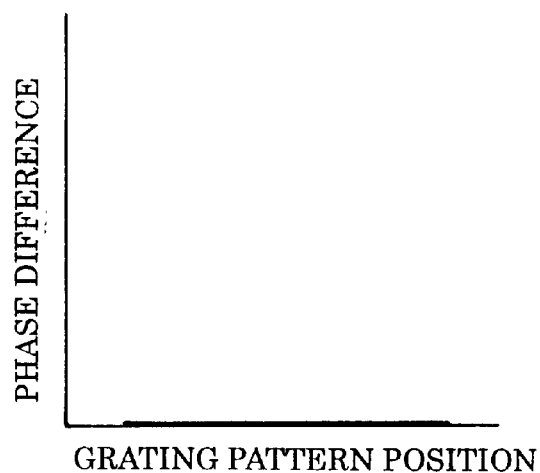
Figure 9B:
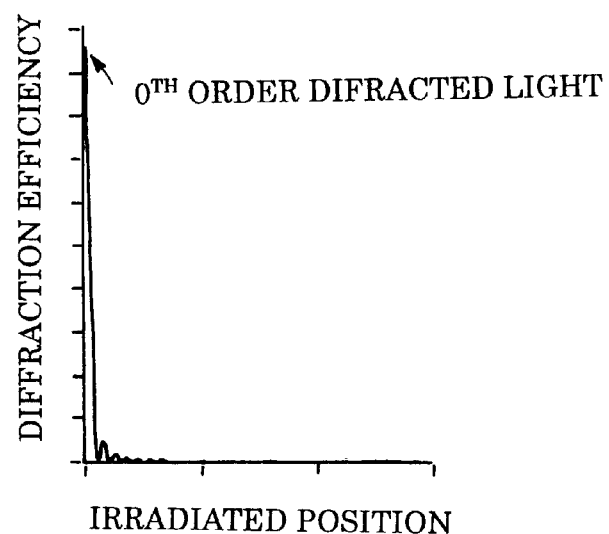

FIG. 9A is a graph showing the phase difference Δd of the grating patterns in the case where the voltage Va and Vb are not applied, namely, Va=Vb=0. In this case, since no voltage is applied to the whole area of the liquid crystal panel 2, the liquid crystal panel 2 simply functions as a glass plate, and the light beams passed through the grating patterns does not have the phase difference Δd and the liquid crystal panel 2 does not function as the diffraction grating. Therefore, as shown in FIG. 9B, no high-order diffracted light is generated, and only the 0th order diffracted light is generated. This corresponds to the case that Δd=0 on the graph shown in FIG. 3A. As a result, since only the above-mentioned main-beam spot 10a is irradiated, this case can be utilized in the one-beam mode.

Figure 10A:
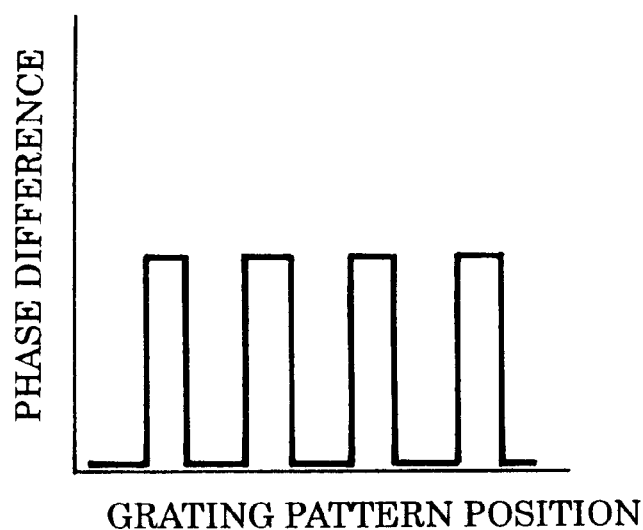
Figure 10B:
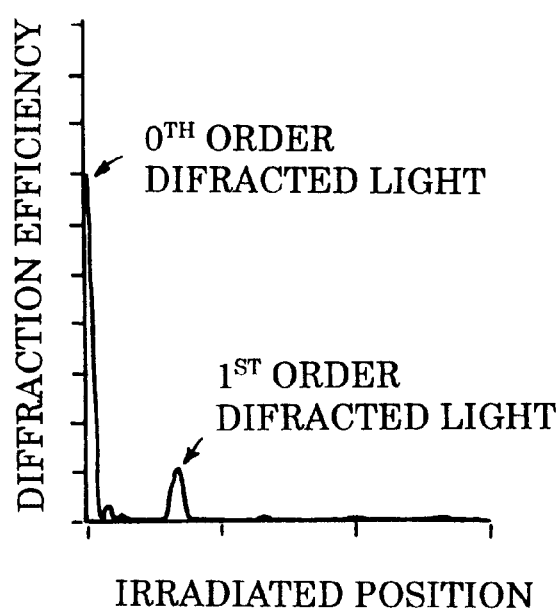

FIG. 10A is a graph showing the phase difference Δd of the grating patterns in the case where the voltage Va is applied to the area A and the voltage Vb=0 in the area B. In this case, since the voltage in the area A is higher by Va than the voltage in the area B on the liquid crystal panel 2 and the voltage in the area B is equal to the voltage in the gap area G, the grating patterns of the one end of the area A directly functions as the diffraction grating. For this reason, as shown in FIG. 10A, the grating patterns functions as the diffraction grating, and the predetermined phase difference Δd is given to the light beams passed through the grating patterns. Therefore, as shown in FIG. 10B, the 0th order diffracted light and the 1st order diffracted light are generated with a predetermined proportion. Here, since the duty D is 50%, the 2nd order diffracted light is not generated. As a result, by adjusting irradiation of the above-mentioned main-beam spot 10a and the sub-beam spots 10b and 10c, this case can be utilized in the DPP mode.

Figure 11A:
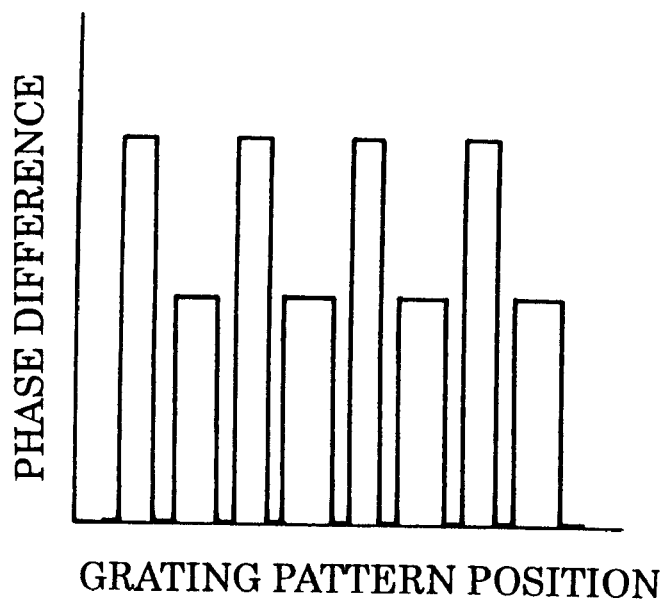
Figure 11B:
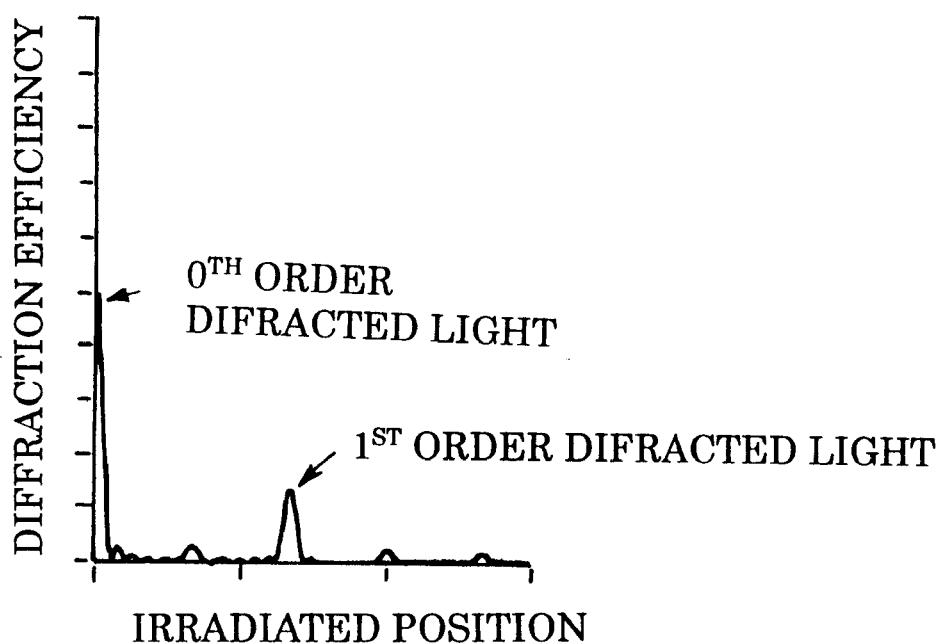

FIG. 11A is a graph showing the phase difference Δd of the grating patterns in the case where the voltage Va is applied to the area A and the voltage Vb is applied to the area B. In this case, the grating patterns of the liquid crystal panel 2 is formed as the combination of the grating patterns at the one end of the area A and the grating patterns at the one end of the area B. Namely, as shown in FIG. 11A, the pitches P of the grating patterns thus formed is halved, i.e., P/2. Thus, the grating patterns functions as the diffraction grating which alternately generates the phase differences corresponding to the voltage Va and the phase difference corresponding to the voltage Vb. Therefore, as shown in FIG. 11B, the 0th order diffracted light and the 1st order diffracted light are generated with a predetermined proportion, and the distances between the irradiated position of the 0th order diffracted light and the irradiated positions of the 1st order diffracted lights is doubled compared with the case of FIG. 10B. As a result, by adjusting the irradiated positions of the above-mentioned main-beam spot 10a and the sub-beam spots 10d and 10e, this case may be utilized in the CTC mode.

It is noted that the grating pattern formed on the liquid crystal panel 2 shown in FIG. 8 has only constraint that the pitches P of the patterns at the ends of the areas A and B are equal to each other. In design, the pitch P and duty D are determined suitably. In operation, the applied voltages Va and Vb are varied so that the diffraction characteristic can be controlled suitably. As a result, the irradiation intensities and irradiated positions of the respective diffracted lights, namely, the main-beam spot 10a and the respective sub-beam spots 10b through 10e may be set suitably without being limited to the examples shown in FIGS. 9 through 11.

Figure 12:
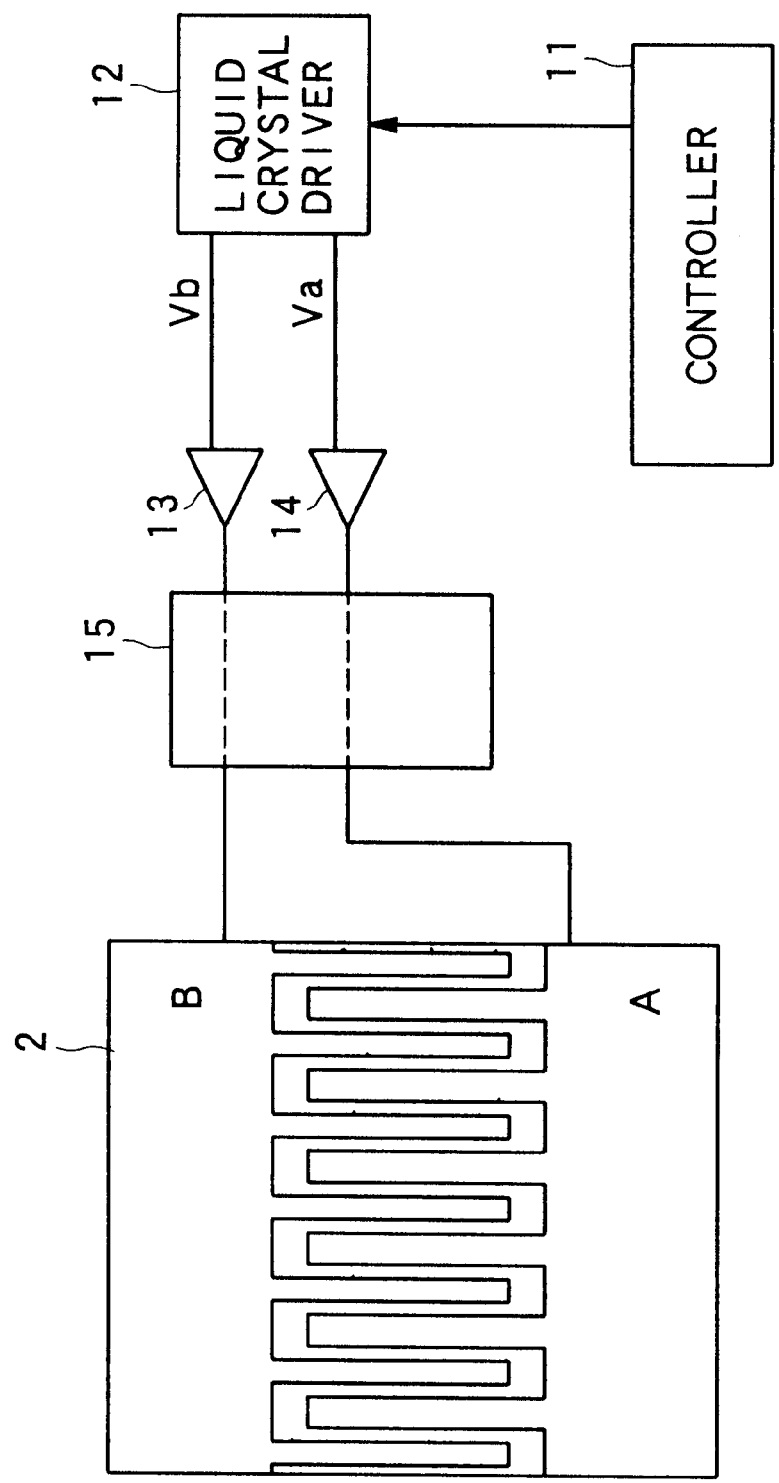
FIG. 12 is a block diagram showing an example of a control unit of the liquid crystal panel according to the embodiment.

Next, the structure of a control unit of the liquid crystal panel 2 according to the present embodiment will be described with reference to FIG. 12. As shown in FIG. 12, the control unit of the liquid crystal panel 2 has a controller 11, a liquid crystal driver 12, amplifiers 13 and 14, and an amplitude modulator 15. In the above structure, the controller 11 discriminates the mode to be set by selecting it from three types of the modes of the optical pickup according to the operating state of the reproduction or recording apparatus employing the pickup, and instructs the liquid crystal driver 12 to apply the voltage to the liquid crystal panel 2. The liquid crystal driver 12 receives the instruction from the controller 11, and outputs the voltage Va to the area A of the liquid crystal panel 2 and the voltage Vb to the area B. As mentioned above, no voltage may be applied as the voltages Va and Vb so that the voltages of the areas A and B are set to zero.

The voltages Va and Vb outputted from the liquid crystal driver 12 are amplified by a predetermined gain respectively by the amplifiers 13 and 14 so as to have suitable voltage values, which are outputted to the amplitude modulator 15. The amplitude modulator 15 modulates an amplitude of an alternating voltage having a predetermined frequency according to the amplified applied voltages Va and Vb so as to output the modulated alternating voltage to the liquid crystal panel 2. This is because the liquid crystal panel 2 is driven by the alternating voltage, and the phase difference Δd of the respective areas A and B is controlled by the amplitude value of the alternating voltage. In the liquid crystal panel 2, the divided area A is driven by the modulated signal corresponding to the applied voltage Va, and the divided area B is driven by the modulated signal corresponding to the applied voltage Vb. As a result, a certain phase difference Δd is given to the optical beams passing through the divided areas A and B.

Figure 13:
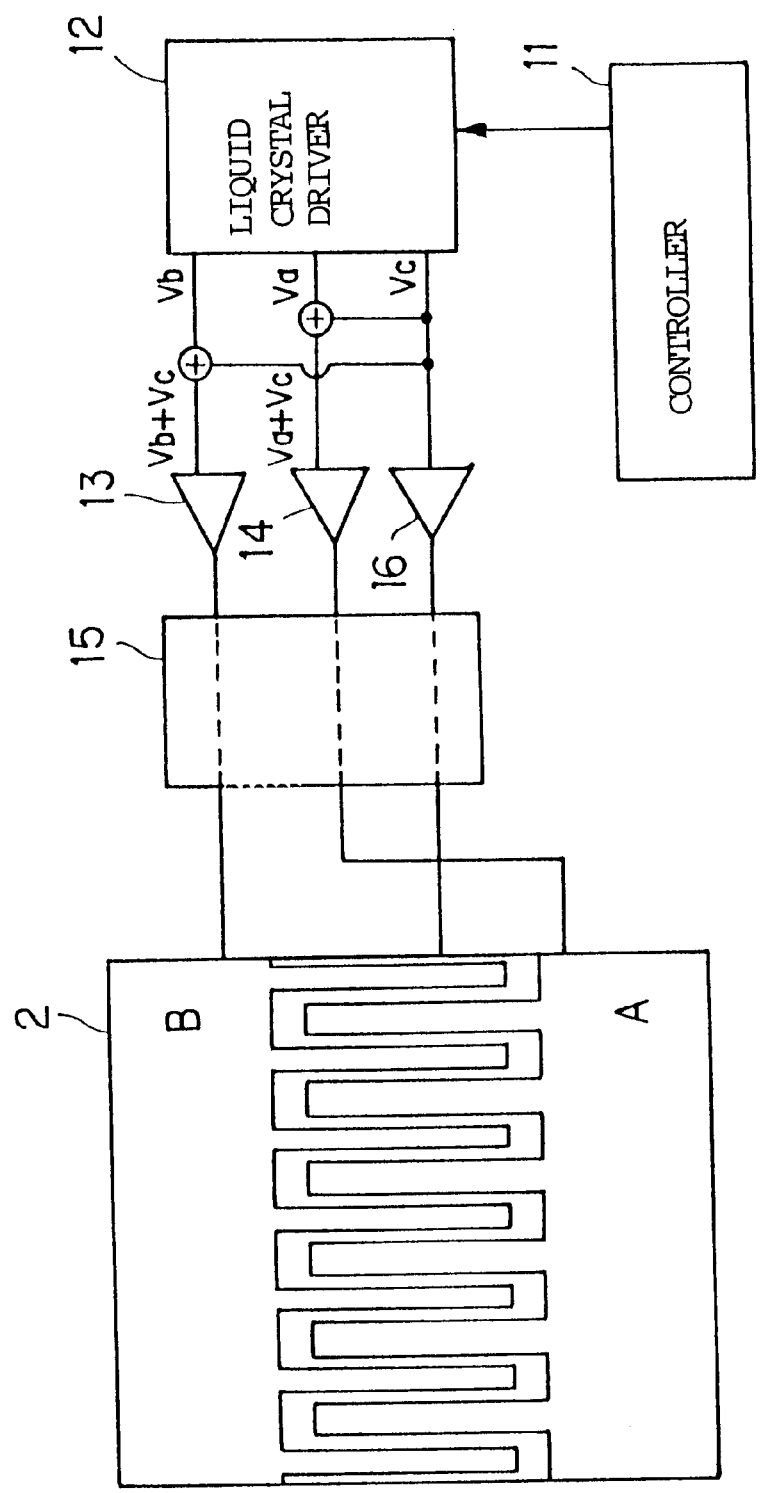
FIG. 13 is a diagram showing another example of the control unit of the liquid crystal panel.

FIG. 13 shows another structure of the aforementioned control unit of the liquid crystal panel 2. In the structure shown in FIG. 13, in addition to the structure of FIG. 12, a bias voltage Vc is applied to the whole portion of the liquid crystal panel 2. As a result, this bias voltage gives a reference of the phase difference Δd in the areas A and B, and the gap area G at the boundary portion of both the areas A and B is always kept biased at the level Vc. More concretely, the liquid crystal driver 12 outputs the voltage Vc according to the instruction from the controller 11, and adds it to the voltage Va for the area A and the voltage Vb for the area B. Thereafter, the area A is driven by the voltage supplied via the amplifiers 14 and the amplitude modulator 15 with a phase correction amount corresponding to (Va+Vc), and the area B is driven by the voltage supplied via the amplifiers 13 and the amplitude modulator 15 with a phase correction amount corresponding to (Vb+Vc). The gap area G at the boundary portion of the areas A and B is driven by the voltage Vc supplied via the amplifier 16 and amplitude modulator 15 with a phase correction amount corresponding to Vc.

At this time, by controlling the voltages such that Va=Vb= Vc, the one-beam mode can be executed. Namely, since the whole area of the liquid crystal panel 2 is driven by the applied voltage Vc and no phase difference Δd is given to the light beams passing therethrough, the liquid crystal panel 2 functions as a simple glass substrate, and thus the diffraction function is not carried out.

The aforementioned optical pickup according to the present embodiment can be employed in an information recording apparatus or a reproduction apparatus which is capable of recording or reproducing information on or from an information recording medium. The information recording or reproduction apparatus is set to the DPP mode when the recording operation is performed, set to the one-beam mode when the standard recording or reproduction is executed, and set to the CTC mode when a CTC is operated in performing the reproduction operation. When the applied voltages to the liquid crystal panel 2 are varied according to the respective modes, in the optical pickup, the irradiation state and the irradiated positions of the light beams are appropriately varied according to the respective modes.

The present embodiment described the case where the present invention is applied to the optical pickup which is controlled by switching between three types of the operation modes, i.e., the one-beam mode, the DPP mode and the CTC mode. However, the application of the present invention is not limited to this, and thus the present invention may also be applied widely to an optical pickup which can be used for various objects by varying the applied voltages Va and Vb to the areas A and B of the liquid crystal panel 2 and controlling the irradiation state and the irradiated positions of the light beams.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 10-072912 filed on Mar. 20, 1998 including the specification, claims, drawings and summary is incorporated herein by reference in its entirety.

What is claimed is:

1. An optical pickup for irradiating a light beam onto an information recording medium and receiving a light reflected by the medium, comprising:

a light source for emitting a light beam;

a liquid crystal panel for diffracting the light beam to produce a mean beam and a plurality of sub-beams to be irradiated on the medium, the liquid crystal panel comprising a first area in which a first group of grating patterns with first predetermined pitches is formed and a second area in which a second group of grating patterns having second predetermined pitches is formed, the first group of grating patterns and the second group of grating patterns being arranged on a plane with a gap area formed between the first area and the second area so as to form an integrated grating pattern, the first area comprising a first common area through which a voltage is supplied to all of the first group of grating patterns, the second area comprising a second common area through which a voltage is supplied to all of the second group of grating patterns; and a control unit for applying a first voltage to the first common area to control a refractive index of the first area and applying a second voltage to the second common area to control a refractive index of the second area, thereby to control a diffraction characteristic of the integrated grating pattern.

2. The optical pickup according to claim 1, wherein the control unit operates by selecting one of a first mode or applying both the first voltage and second voltage and second mode for applying either one of the first voltage and second voltage.

3. The optical pickup according to claim 1, wherein said control unit operates by selecting one of a first mode for applying both the first voltage and second voltage, a second mode for applying either one of the first voltage and second voltage, and a third mode for applying neither the first voltage nor second voltage.

4. The optical pickup according claim 2, wherein a direction and the pitch of the grating patterns are preset such that the main-beam is irradiated onto a recording track and the sub-beams are irradiated onto inter-tracks neighboring to the recording track on which the main-beam is irradiated in the second mode and the main-beam is irradiated onto a recording track and the sub-beams are irradiated onto the recording tracks neighboring to the recording track on which the main-beam is irradiated in the first mode.

5. The optical pickup according to claim 3, further comprising a light receiving unit comprising first to fifth detectors arranged in a line, wherein the third detector receives the main-beam reflected by the recording track in the first to third modes, wherein the second and the fourth detectors neighboring the third detector receive the sub-beams reflected by the inter-tracks in the second mode, and wherein the first and the fifth detectors positioned outside of the second detector and the fourth detector, respectively, receive the sub-beams reflected by the neighboring tracks in the first mode.

6. The optical pickup according to claim 5, wherein the first detector is a four-divided detector, and wherein the second detector and the fourth detector are two-divided detectors.

7. The optical pickup according to claim 1, wherein the control unit comprises:

a liquid crystal driver for outputting the first voltage to the first area and outputting the second voltage to the second area; and a controller for controlling the voltage outputted by the liquid crystal driver.

8. The optical pickup according to claim 7, wherein the liquid crystal driver additionally outputs a reference voltage to the whole area of the liquid crystal panel including the first area, the second area and the gap area.

9. The optical pickup according to claim 1, further comprising an objective lens for converging the main-beam and the sub-beams on the recording medium.

10. The optical pickup according to claim 1, wherein the control unit operates by selecting one of a first mode for applying both the first voltage and second voltage thereby to form the integrated grating pattern of a first grating pitch, and a second mode for applying either one of the first voltage and the second voltage to form the integrated grating pattern of a second grating pitch, the second grating pitch being twice larger than the first grating pitch.

11. A method for irradiating a light beam onto an information recording medium and receiving light reflected by the medium, the method comprising:

transmitting a light beam into a liquid crystal panel having a first area of grating patterns with predetermined pitches of a first value and a second area of grating patterns with predetermined pitches of a second value, the first area and the second area being arranged on a plane with a gap area formed between the first area and the second area so as to form an integrated grating pattern;

controlling a first voltage applied to the first area so as to control a refractive index of the first area;

controlling a second voltage applied to the second area so as to control a refractive index of the second area;

directing light from the liquid crystal panel to the information recording medium; and receiving light reflected from the medium.

12. The method according to claim 11, wherein said step of transmitting a light beam into a liquid crystal panel produces a main beam and a plurality of sub-beams.

13. The method according to claim 12, further comprising selecting a mode of operation, the mode of operation comprising: a first mode, wherein the step of controlling a first voltage applies a non-zero voltage to the first area and the step of controlling a second voltage applies a non-zero voltage to the second area; a second mode, wherein the step of controlling a first voltage applies a zero voltage to the first area and the step of controlling a second voltage applies a non-zero voltage to the second area or the step of controlling a first voltage applies a non-zero voltage to the first area and the step of controlling a second voltage applies a zero voltage to the second area; and a third mode, wherein the step of controlling a first voltage applies a zero voltage to the first area and the step of controlling a second voltage applies a zero voltage to the second area.

14. The method according to claim 13, wherein the direction and pitches of the first area of grating patterns and second area of grating patterns are preset such selection of the second mode of operation provides that the main-beam is irradiated onto a recording track and the sub-beams are irradiated onto inter-tracks neighboring to the recording track and that selection of the first mode of operation provides that the main-beam is irradiated onto a recording track and the sub-beams are irradiated onto the recording tracks neighboring to the recording track on which the main-beam is irradiated.

15. The method according to claim 14, wherein said step of receiving light reflected from the medium comprises receiving light with a light receiving unit including first to fifth detectors arranged in a line, wherein the third detector receives the main-beam reflected by the recording track when the first, second, or third mode is selected, wherein the second and the fourth detectors neighboring the third detector receive the sub-beams reflected by inter-tracks when the second mode is selected, and wherein the first and the fifth detectors positioned outside of the second detector and the fourth detector, respectively, receive the sub-beams reflected by the neighboring tracks when the first mode is selected.

16. The method according to claim 12 wherein the step of directing light from the liquid crystal panel comprises directing light into an objective lens for converging the main-beam and the sub-beams on the recording medium.

17. The method according to 13, wherein the selection of a first mode of operation forms the integrated grating pattern with a first grating pitch and the selection of the second mode of operation forms the integrated grating pattern with a second grating pitch, the second grating pitch being twice larger than the first grating pitch.

* * * * *